METHOD OF AND APPARATUS FOR PRODUCING TUBES OF POLYGONAL CROSS SECTION

Original Filed Sept. 28, 1961 5 Sheets-Sheet 1

Inventor
John M. Macchione
By Olson, Mecklenburger, von Holst, Pendleton & Neuman Attys METHOD OF AND APPARATUS FOR PRODUCING TUBES OF POLYGONAL CROSS SECTION
Original Filed Sept. 28, 1961 5 Sheets-Sheet 2
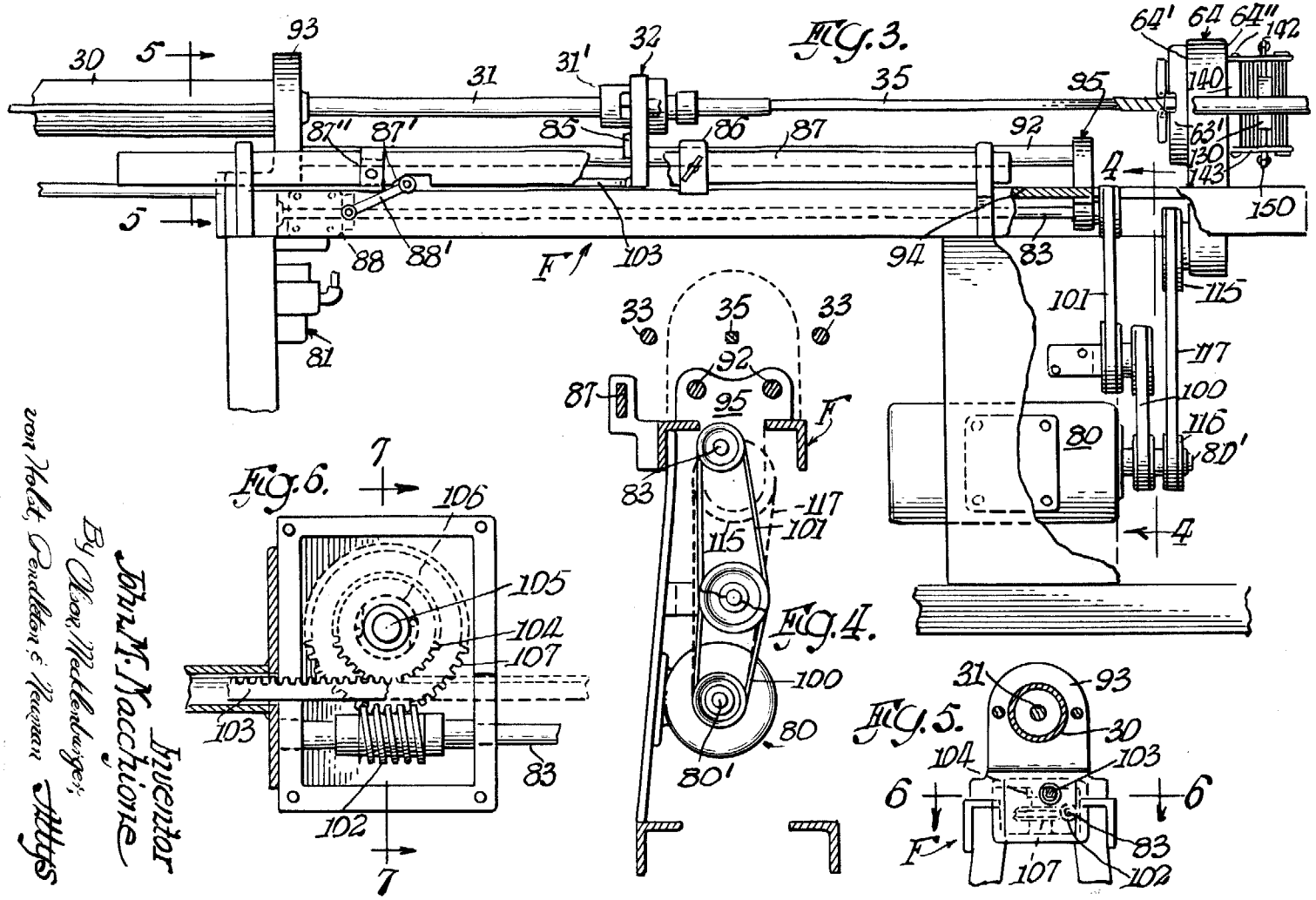
Inventor
John M. Macchione
By Olson, Mecklenburger, von Holst, Pendleton & Neuman Attys

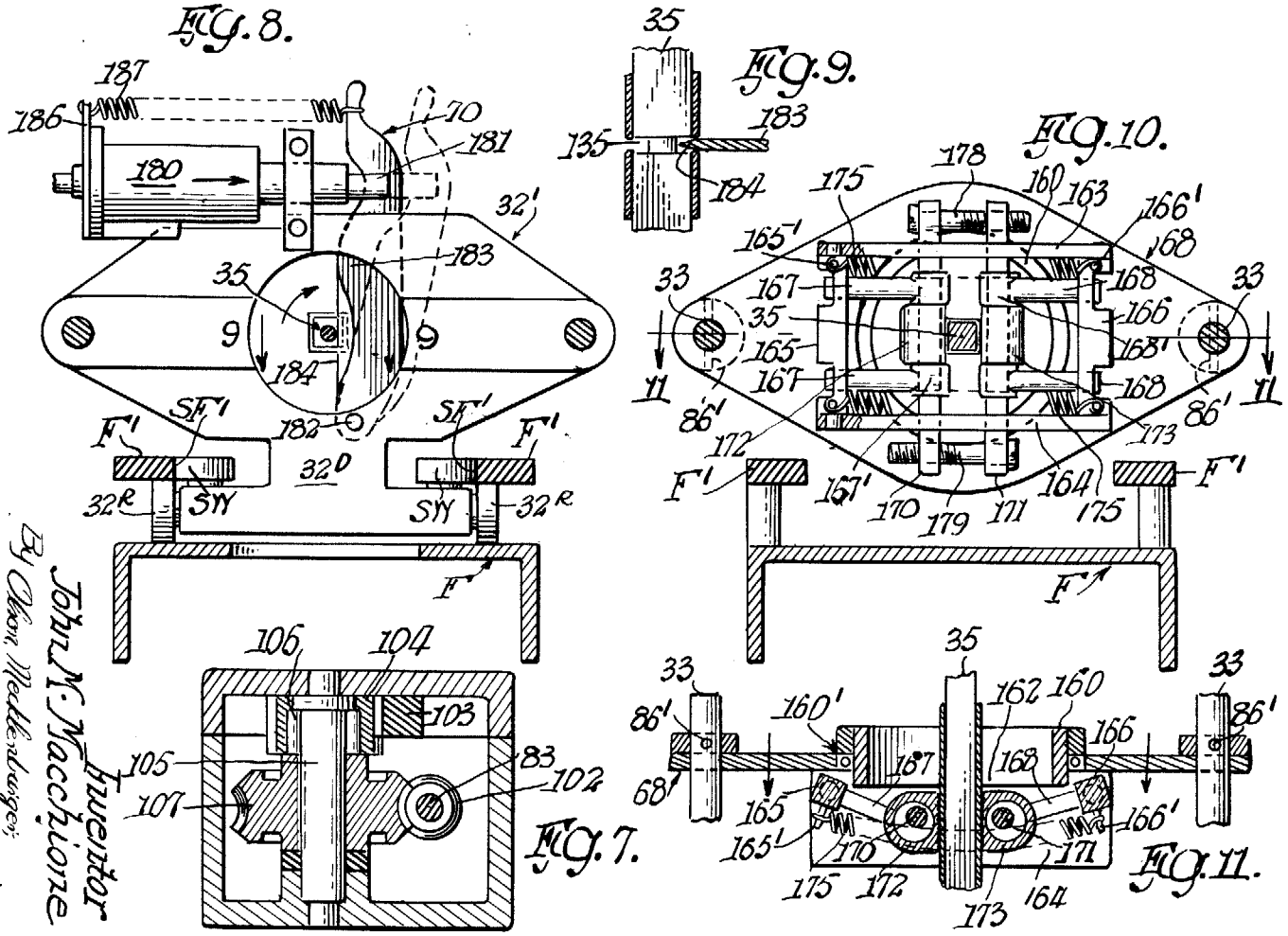
Inventor
John M. Macchione
By Olson, Mecklenburger,
von Holst, Pendleton & Neuman Attys

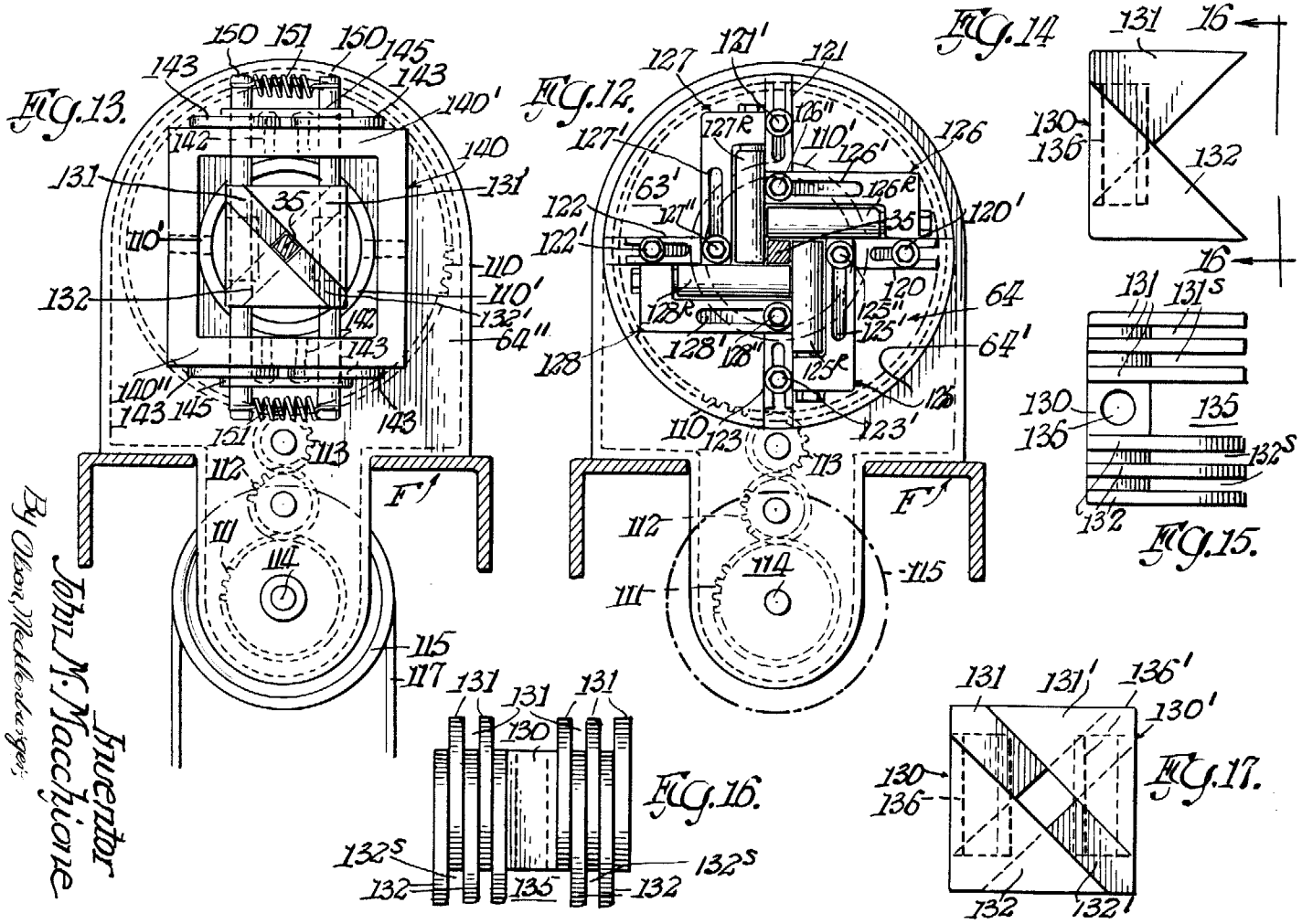
Inventor
John M. Macchione
By Olson, Mecklenburger, von Holst, Pendleton & Neuman Attys Inventor
John M. Macchione
By Olson, Mecklenburger, von Holst, Pendleton & Neuman Attys United States Patent Office Re. 25,820
Reissued July 20, 1965

25,820

METHOD OF AND APPARATUS FOR PRODUCING TUBES OF POLYGONAL CROSS SECTION

John M. Macchione, Lake Breeze Drive, Na-Dell Hills Subdivision, Haines City, Fla.

Original No. 3,120,158, dated Feb. 4, 1964, Ser. No. 141,441, Sept. 28, 1961. Application for reissue May 25, 1964, Ser. No. 380,731
10 Claims. (Cl. 93—80)

Matter enclosed in heavy brackets [ ] appears in the original patent but forms no part of this reissue specification; matter printed in italics indicates the additions made by reissue.

The invention relates generally to methods of an apparatus for producing tubes of polygonal cross section, but it relates more particularly to methods of and apparatus for the production of laminated tubes formed of a plurality of tapes or ribbons of material of which paper tubes of square and rectangular shapes are typical examples. As a matter of convenience, therefore, reference will be made to the production of rectangular paper tubes, it being understood that this is by way of illustration and not by way of limitation, since tubes of other polygonal shapes can be produced and the tapes or ribbons may be of flexible material other than paper.

In the manufacture of rectangular paper tubes of the type to which reference has been made, a plurality of paper tapes or ribbons is wound around an arbor of rectangular cross section, the several tapes or ribbons being caused to adhere together to produce a laminated tube.

A typical example of a paper tube of this type, which is extensively made, is on the order of from 24 to 30 inches in length. It will be understood that the arbor about which the paper tapes are wound rotates and advances during the formation of the laminated tube and must be withdrawn from the tube to its starting position for another cycle of operation. However, the tube being tightly formed around the arbor results in creating considerably resistance to the movement of the arbor rearwardly as it is moved relatively to portions of the formed tube. As a result of this substantial resistance between the tube and arbor, in prior practice the arbor supporting the tube is only a part of the length of the finished tube. The result is that a considerable part of the advancing end portion of the tube is unsupported by the arbor. At this time the tube is still damp and tends to twist which is undesirable and results in a considerable number of rejects.

In such prior practice, in order to form a tube of the length generally desired, several cycles of operation are required which reduce the number of tubes of a given length which can be produced per unit of time and are also a factor increasing the cost thereof.

The general object of the invention is to provide a method of and apparatus for producing rectangular paper tubes more rapidly and at lower cost.

Another object of the invention is to provide a method of and apparatus for producing rectangular paper tubes whereby less rejects result.

A further object of the invention is to provide a method of and apparatus for producing in a single cycle of operation a substantially longer rectangular tube while the tube is supported by the arbor about which the tube is formed.

Still another object of the invention is to provide an improved method of and means for severing the desired length of formed tube to be removed from portions remaining on the arbor and which are to constitute a part of the following tube length.

Again it is an object of the invention to improve means for advancing and rotating the arbor during the tube-forming part of the cycle and for more rapidly retracting the arbor to a position for initiating a new cycle of operation.

The manner in which the above-named objects and others are attained will be better understood by reference to the accompanying drawings which illustrate a preferred embodiment of the invention in which:

FIG. 3 is a view in side elevation of part of the machine as viewed along the line and in the direction of the arrows 3—3 in FIGS. 1 and 2;

FIG. 4 is a fragmentary vertical sectional view through a part of the machine as taken on the line 4—4 of FIG. 3;

FIG. 5 is a vertical transverse sectional view through a rear end part of the machine as taken on the line 5—5 of FIG. 3;

FIG. 6 is a horizontal detail sectional view, on an enlarged scale, as taken on the line 6—6 of FIG. 5;

FIG. 7 is a vertical sectional view through the gear box of FIG. 6 as taken on the line 7—7 thereof;

FIG. 8 is a vertical sectional view through a part of the machine as taken on the line 8—8 of FIG. 2, but on an enlarged scale;

FIG. 9 is a horizontal detail sectional view as taken on the line 9—9 of FIG. 8, but on a larger scale;

FIG. 10 is a vertical detail sectional view through the machine as taken on the line 10—10 of FIG. 2, but on the scale of FIG. 8;

FIG. 11 is a horizontal detail sectional view as taken on the line 11—11 of FIG. 10;

FIG. 12 is a vertical sectional view through a part of the machine as taken on the line 12—12 of FIG. 2, but on the scale of FIGS. 8 and 10;

FIG. 13 is a vertical sectional view through a part of the machine as taken on the line 13—13 of FIG. 2, but on the scale of FIGS. 8–10 and 12;

FIG. 14 is an end elevational view of one of the two interfitting K-shaped gripping jaws shown in the structure of FIG. 13, but on a larger scale;

FIG. 15 is a top plan view of the gripping jaw shown in FIG. 14;

FIG. 16 is an elevational view of the gripping jaw shown in FIG. 14 when viewed in the direction of the arows 16—16 thereon;

FIG. 17 is an end elevational view of a pair of the gripping jaws shown in FIG. 13 as operatively interfitted, but on a scale larger than that of FIG. 13;

Before describing the details of construction of the various parts of the apparatus illustrated and by which the method of the invention can be practiced a general statement of some of the basic parts and the general mode of operation thereof will be given in order to facilitate an understanding thereof.

As by way of example the machine illustrated is adapted to produce square tubes of considerable length during a single advancing movement of the arbor on which the several tapes forming the tube are wound.

Figure 1:
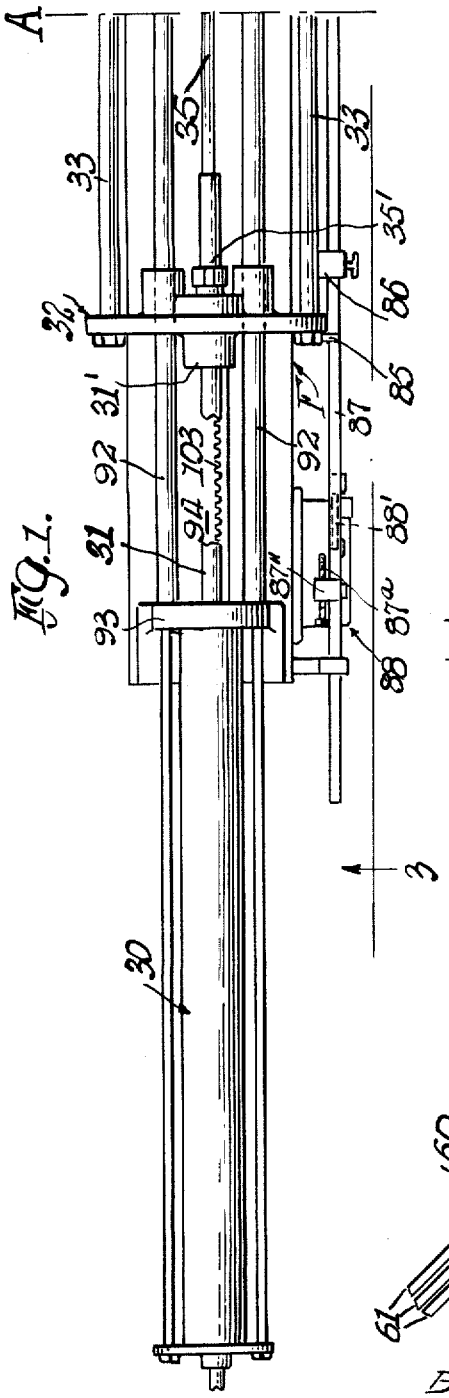
FIGS. 1 and 2 are views from above the left or rear end and the right or front ends of the machine, respectively, so that if joined along the lines A—A thereof, they coact to disclose a top plan view of the entire machine.
Figure 2:
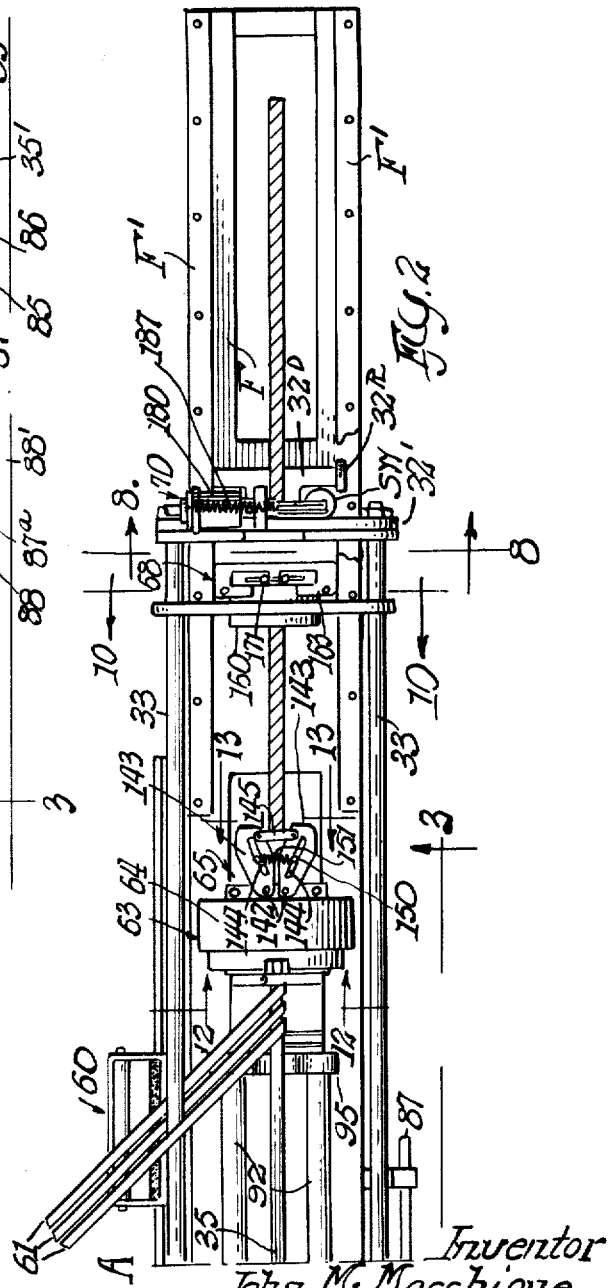

Referring first particularly to FIGS. 1, 2 and 3, at the rear of the machine is an air cylinder 30 having a piston therein (not shown) from which extends a piston rod 31, the latter being connected to a cross head 32 which by means of a pair of rods 33 is connected to a cross head 32', the cross heads and rods constituting a carriage.

On the forward movement of the pistons, the drive, the carriage (and hence to the arbor) is through the clutch and gear construction shown in detail in FIGS. 5 and 6 at a controlled and relatively slow rate of speed, which is properly timed to the arbor rotation. On the return stroke of the piston, the carriage and piston rod move at piston speed because of the "free wheeling" action of the clutch mechanism (see FIGS. 5 and 6) relative to the mechanism which controls the forward movement of the carriage.

At 60 there is a conventional trough for wetting the tapes 61 (in conventional manner) which pass to and are wound helically around the arbor 35 and adhesively joined to each other.

At 63 there is a novel tape lay-on head driven from gearing in the gear box 64. Also driven from the gearing in gear box 64 is certain novel tube-gripping mechanism 65 in the form of interfitting gripping jaws, shown in detail in FIGS. 13 to 17, which in the forward movement of the tube and arbor apply pressure tending to form the tube to the arbor. Upon retraction of the arbor these jaws function to press the bowed sides of the tube toward the arbor so as to flatten the sides of the tube and free the tube from the arbor, thereby reducing the frictional resistance between tube and arbor as the arbor is rapidly retracted for another cycle of operation.

Forward of the parts just referred to is certain tube-gripping mechanism 68, shown in detail in FIGS. 10 and 11, which as the tube tends to move rearwardly relative to the arbor presses the formed tube against the arbor to cause the tube and arbor to advance together, but which functions to release pressure against the tube when the arbor and the tube-gripping mechanism is retracted.

In advance of the parts just mentioned is cutoff mechanism 70 which is attached to cross head 32' of the carriage so as to move therewith. Details of the cutoff mechanism are shown in FIGS. 8 and 9.

GENERAL STATEMENT RE CYCLE OF OPERATION

Assume that the carriage and arbor are in fully retracted position at which time the electric motor 80, which furnishes the motive power for all driven parts not actuated by the air cylinder 30, is de-energized. At this time an air valve solenoid 81, which controls the flow of air to the air cylinder 30 has operated to open an air valve to the rear end of the air cylinder 30 so that air under pressure is applied to the piston in the air cylinder, tending to drive the piston in a forward direction. At the same time the circuit to motor 80 is closed, thereby to energize same and drive shaft 83. By means of the gear rack and clutch and worm gear arrangement shown in detail in FIGS. 5 and 6, the carriage and the arbor connected thereto are caused to advance at relatively slow speed, the arbor being rotated and the paper tapes being wound upon the advancing arbor to form the tube because the lay-on winding head is being driven through a belt and pulley arrangement (see FIGS. 3 and 4).

At a predetermined position in the advancing movement a projection 85 on the cross head 32 engages an adjustable member 86 secured to the longitudinally movable bar 87 and causes movement thereof. Movement of the bar 87 causes primary cam surface 87' to actuate lever 88' which operates electrical switch 88 to open the circuit to the electric motor 80 which being of the brake type stops quickly but not instantaneously due to momentum. Hence, there is some further movement of the carriage which continues to advance the bar 87. Secondary cam surface 87'' is positioned further to depress lever 88' actuating another set of contacts in the same switch so as to actuate valve 81 and apply air pressure ahead of the piston in the air cylinder which then functions rapidly to return the carriage and arbor to the initial or starting position ready for another cycle of operation. It should be understood that in the return movement of the carriage the projection 85 of the carriage engages a screw member 87a carried by the stop 87'' adjustably fixed to the bar 87, thus returning bar 87 to starting position and also permitting lever 88' of switch 88 to return to its starting position.

It will, of course, be understood that in the advancing movement of the arbor certain of the mechanism functions as before generally described and that the cutoff mechanism operates to sever a length of finished tube from the portion of the tube still on the arbor and that which is in the process of formation.

MECHANISM FOR ADVANCING AND RETRACTING THE CARRIAGE AND ARBOR CONNECTED THERETO

As before explained generally, 30 is an air cylinder containing a piston (not shown) to which is connected the piston rod 31. The forward end of the piston rod 31 terminates in and is affixed to a hollow boss 31' which is a part of the carriage cross head 32.

The cross head 32 is slidable upon a pair of rods 92 which extend between the member 93 at the forward end of the air cylinder which member 93 is affixed to and upstands from the bed 94 of the machine frame and the bracket 95 which is affixed to and upstands from the bed of the machine frame adjacent to but rearwardly of the position where the several tapes are wound upon the arbor (see FIGS. 1, 2 and 3).

The cross head 32' (see FIG. 8) includes a depending portion 32D to which are rotatably secured a pair of rollers 32R which roll on the upper faces of the machine frame F and are held down by overlying frame portions F'. To prevent side sway rollers SW mounted on vertical pivots are provided, the rollers SW having rolling contact with the confronting portions of the frame portion SF'.

It will be understood that a source of air under pressure (not shown) is available and connected to solenoid air valve 81 which in turn has connections to the air cylinder at the rear of and in advance of the piston in the air cylinder so that movement of the piston in forward and reverse directions can be caused dependent upon the position of the solenoid operated air valve 81.

When air is being supplied to the rear end of the cylinder 30 the electric motor 80 is energized driving shaft 83 through belts 100, 101 and pulleys associated therewith (see FIGS. 3 and 4). Thus while the piston rod 31 applies force tending to move the carriage and arbor 35 forwardly the speed of advance of the carriage is regulated by the rotation of shaft 83 which turns the worm 102 (see FIGS. 5 and 6). Regulation obtains because the gear rack 103, which is connected at its forward end to cross head 32 of the carriage, meshes with a gear 104 which is operatively connected to shaft 105 by means of the one-way clutch 106. Connected to rotate with shaft 105 is a larger gear 107 which meshes with the worm 102 that rotates with shaft 83.

From the foregoing construction it can be seen that when force is applied to move the carriage in an advancing direction and hence to advance the gear rack 103 the speed of forward movement of the carriage and arbor is limited by the rotational speed of the worm 102 which meshes with gear 107 fixed to shaft 105 to which the one-way clutch is operatively connected. When, however, air is supplied to the air cylinder in advance of the piston therein the carriage and arbor are retracted through the medium of the piston rod. On the reverse movement the carriage, piston rod and arbor move rapidly at piston speed because the clutch 106 then overruns and is not limited by the rotation of gear 107 as controlled by worm gear 102.

MEANS FOR WINDING OR LAYING TAPES ON ARBOR AND FOR ROTATING ARBOR

In this connection reference should be made to FIGS. 2, 3, 4 and 12. In the gear box 64 is a large gear 110 which is rotated through a train of gears 111, 112 and 113, gear 111 being mounted on shaft 114 to which there is fixed pulley 115, the latter being driven from motor 80 through pulley 116 on armature shaft 80' of motor 80 and belt 117.

Gear 110 is fixed to rotate with a hollow spindle 110' the spindle being mounted for rotation in the end walls 64' and 64'' of the gear case 64. Fixed to rotate with gear 110 is the tape lay-on mechanism best shown in FIG. 12. This mechanism comprises a face plate 63' mounted on the spindle 110', four radially disposed members 120, 121, 122 and 123, each radially adjustable in grooves in the face plate and fixed in adjusted position by means of the stud bolts 120', 121', 122' and 123', respectively, the shanks of which are accommodated in the slotted openings in the respective members, threaded ends of the stud bolts entering threaded openings in the face plate.

Figure 18:
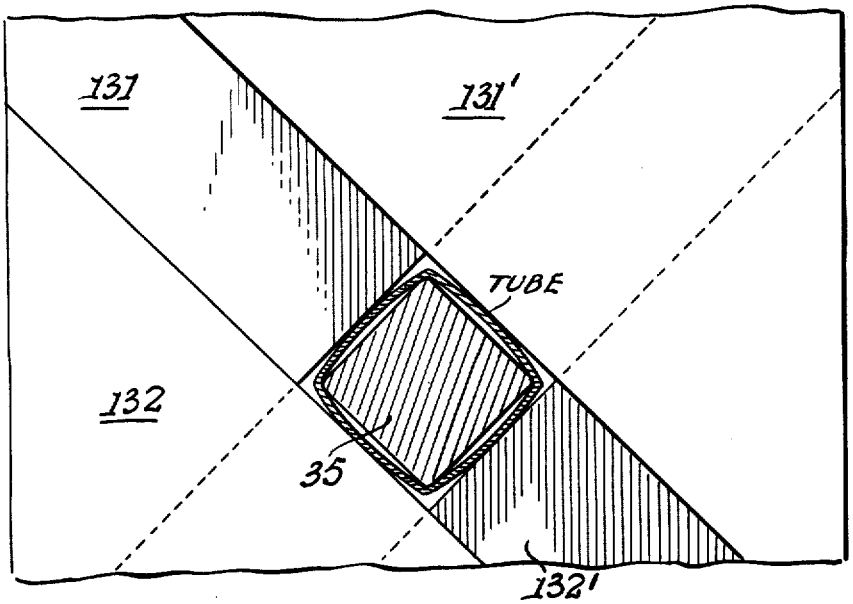
FIG. 18 is a schematic fragmentary view showing the gripping jaws, arbor and paper tube in the condition which the parts occupy as the arbor and tube are advancing, a formed part of the tube enveloping the arbor.

The mechanism also comprises four L-shaped members 125, 126, 127 and 128 which are slidably mounted in grooves in the members 120 to 123, respectively, so as to move outwardly or inwardly therewith. The shank portions of members 125 to 128, inclusive, are provided with a slotted opening 125' to 128' through which the shanks of stud bolts 125'' to 128'', inclusive extend, threaded ends of the bolts entering threaded openings in members 120 to 123, inclusive, permitting adjustment in a direction at right angles to members 120 to 123, inclusive. Mounted for rotation on stud shafts carried by the L-shaped members 125 to 128, inclusive, are rollers 125R to 128R, inclusive, the end portions of which define a square space the side of which is spaced a slight distance from and parallel to the sides of the square arbor, the space being just sufficient to accommodate the several paper tapes which are wound on the arbor and which form the tube. For illustrative purposes the tube is not shown in FIG. 12, but it will be understood that the tube would be formed at that time and that the rollers would be exerting pressure to flatten the tube sides against the flat sides of the arbor. However, as soon as the tube advances beyond the rollers the pressure is relieved and the tube sides spring away from the flat sides of the arbor assuming a bowed or cambered shape as shown in FIG. 18.

It should be understood that the rollers 125R to 128R, inclusive, also serve to impart rotation to the arbor. The drive from the motor 80 through the pulley belts and gearing to the lay-on mechanism is so related to the controlled advancing movement of the arbor through the shaft 83 and control mechanism shown in detail in FIGS. 5 and 6 that the proper helical disposition of the tapes on the arbor results. It should be mentioned that the pulley assembly 101', around which belts 100 and 101 operate, is of the adjustable drive type so that the speed of rotation of shaft 83 can be changed. Changing speed of shaft 83 affects the pitch of the tapes being wound on the arbor 35. This allows use of various widths of tapes and arbor sizes.

INTERFITTING JAW CONSTRUCTION AND MODE OF OPERATION

The details of this mechanism are best shown in FIGS. 2, 3 and 13 to 17, inclusive, and the manner in which the jaws function during forward and rearward movement of the arbor are shown in the enlarged fragmentary views 18, 19 and 20.

This mechanism includes two gripping jaws, one of which is shown in FIGS. 14, 15 and 16 and two interfitting jaws which are shown in FIG. 17. Since the jaws are similar in construction, a description of one will first be given and then the same numbers primed will be applied to the complementary parts of the other jaw. Referring to FIG. 14 which is an elevational face view of the lower left-hand jaw of FIG. 13, on a larger scale and separated from the other jaw and other cooperative mechanism shown in FIG. 13, the gripping jaw so viewed is generally K-shaped and comprises a block of metal 130 provided with a plurality of generally triangularly shaped upper portions 131 spaced apart to provide a plurality of slots 131S and a plurality of generally triangularly shaped lower portions 132 spaced apart to provide a plurality of slots 132S.

As best appears in FIGS. 15 and 16 the generally triangular plate-like portions are so grouped as to provide a relatively large central space 135. The body of the block is provided with a bore or opening 136 the purpose of which will shortly appear. As is clear from FIG. 17 when two complementary gripping jaws are placed together the triangular portions of one fit into the slots of the other and serve to define a square opening in the center to receive the arbor and the enveloping paper tube.

The mechanism for operatively mounting the pair of jaws in the machine is best shown in FIGS. 2, 3 and 13.

Fixed to rotate with the gear member 110, which drives the tape lay-on mechanism shown in detail in FIG. 12, is a square frame 140 fixed to rotate with the spindle 110' to which the gear 110 is also fixed. Fixed to the upper and lower sides 140' and 140'' of frame 140, by screws 142, are pairs of cam plates 143 provided with slots 144 which extend outwardly and forwardly of gear box 64. The cam plates 143 of each pair are interconnected near their outer ends by a link 145.

Extending through the holes or bores 136 of the gripping jaws 130 are two spaced parallel rods 150, the ends of which extend into and through the slots 144 in the cam plates 143. The outer ends of the rods 150 are connected by tension springs 151 which tend to draw the rods together along converging slots 144 in the cam plates.

Figure 19:
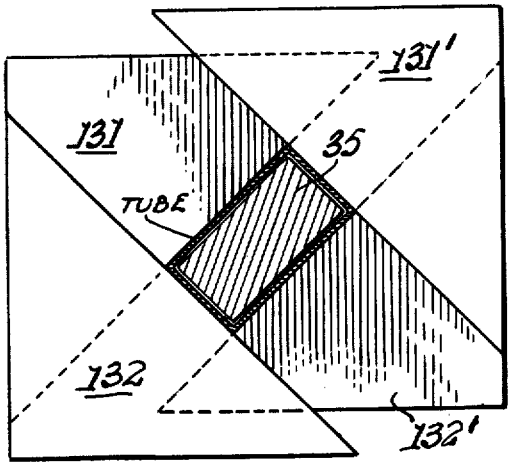
FIG. 19 is a view similar to 18 but showing the changed position of the gripping jaws and the modified cross-sectional shape of the tube such as obtains when the arbor is being retracted.

When the arbor and tube are advancing together the tube has assumed the shape shown in FIG. 18. In the advancing movement of the tube the engagement of the jaw portions with the tube tends to move the rods and the jaws apart by virtue of the outwardly diverging slots 144 in the cam plates 143 through which the rods 150 pass. This construction, in addition to assisting in the formation of the tube, permits the tube to advance through the jaws. When, however, the tube ceases to advance, as when the arbor starts to retract, the springs 151 and cam slots 144 result in causing approaching movement of the two gripping jaws, thus applying pressure on the bowed or cambered sides of the tube of FIG. 18 and generally flattening the sides of the tube as shown in FIG. 19. This flattening action of the sides of the tube results in substantially freeing the tube from contact with the arbor at that zone, thus facilitating retraction of the arbor and permitting the arbor to move rapidly rearwardly as is necessary to start another cycle of operation.

Figure 20:
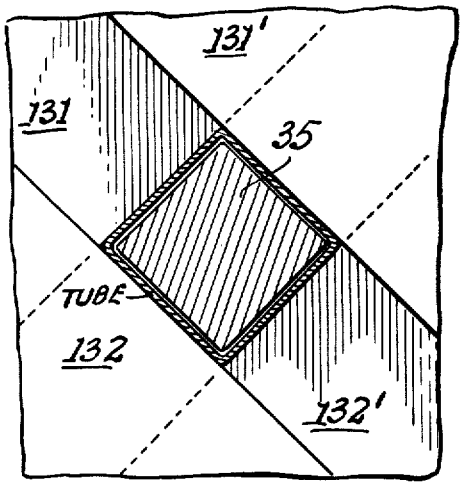
FIG. 20 is a view similar to FIG. 18 but showing a different shape of rectangular tube formation.

FIG. 20 is a view similar to FIG. 18 except that the tube is not square. However, the same action of the gripping jaws obtains as described with respect to the square tube previously described so that it has not been thought necessary to show a view similar to FIG. 19. This different rectangular shape is obtained by the shifting of the jaws relative to each other, along the rods 150 as necessary to conform to the cross-sectional shape of the arbor. The mechanism described is simple and effective in operation and can quickly be adjusted to produce tubes of different shapes and sizes.

As will be shortly explained, means are provided to cause the tube to advance with the arbor in the tube-forming part of the cycle.

SECOND TUBE-GRIPPING MEANS FOR ADVANCING TUBE WITH ARBOR

Forward of the tube-gripping jaws described under the preceding heading is a second tube-gripping means designated by the number 68 and shown in FIGS. 2, 10 and 11. Fixed to the rods 33 by pins 86' is a cross head 68 which moves back and forth with the carriage and, hence, also with the arbor which, as before explained, moves with the carriage in both directions and at the same speed.

The cross head 68 is provided with a central bore in which there is a flanged sleeve 160 mounted on bearing 160' for rotation in the cross head 68. Fixed to the flange portion 162 are spaced parallel members 163, 164 between which are disposed members 165, 166 which are mounted for rocking movement in pivot holes in plates 163, 164. Carried by the members 165, 166 are pairs of inwardly extending arms 167, 168 which terminate in integral hub portions 167' and 168' through which extend rods 170, 171. Mounted eccentrically on the rods 170, 171 are gripping jaws 172, 173 having serrated faces for frictional engagement with the paper tube on the arbor 35.

The members 165, 166 are provided with pins 165', 166' between which extend tension springs 175, tending to rock the members 165, 166 on the vertical pivots on which they are mounted, thus swinging the arms 167, 168, rods 170, 171 rearwardly, tending to move jaws 172 and 173 together. Adjustment of rods 170, 171 and gripping jaws is provided by bolts 178, 179 which are rotatable in one rod and have screw threaded engagement with the opposite rod. This adjustment is used to accommodate the various sizes of tubes.

In the forward movement of the carriage, as indicated by the arrows in FIG. 11, in the event the tube tends to move rearwardly relative to the arbor the arms 167, 168 and the jaws carried thereon move in a direction to clamp the tube on the arbor so that arbor and tube advance together. On the back stroke of the carriage the arms 167, 168 and the jaws 172, 173 carried thereon swing or rock to release the grip on the tube so that the carriage can return to starting operative position. As before explained, on the return of the carriage, the gripping jaws associated with the assembly 65 and shown in detail in FIG. 13 automatically engage the tube sides with pressure sufficient to tend to flatten the tube sides, which also is sufficient to prevent rearward movement of the tube with the arbor.

TUBE CUTOFF MECHANISM

In advance of the second tube-gripping means described above is cutoff mechanism 70 (see FIGS. 2, 8 and 9). Fixed to move with the cross head 32' of the carriage is an air cylinder 180 having a piston therein (not shown) to which is attached a piston rod 181. Air under pressure is supplied to the cylinder 180 at the same time air is supplied to the forward end of cylinder 30.

Pivotally mounted on the cross head 32' at 182 for swinging movement between the full and dotted line positions shown in FIG. 8 is a lever 183 provided with a knife portion 184.

Extending between the upper portion 185 of lever 183 and a member 186 attached to and upstanding from the air cylinder 180 is a tension spring 187 which pulls the lever 183 to the full line position shown in FIG. 8, except when air under pressure is applied to the piston in the cylinder 180. When air is so applied the piston in cylinder 180 moves in the direction of the arrow (FIG. 8) thus moving the piston rod 181 in the same direction and because of the engagement of the piston rod 181 with swinging lever 183 to the dotted line position shown in FIG. 8.

The arbor 135 is provided with an annular groove 135' (see FIG. 9) in which the knife portion 184 of the lever 183 enters when the lever is in the full line position shown in FIG. 8.

At the same time the carriage is in its retracted position ready to move forward, air is released from the cylinder 180, permitting the spring 187 to draw the lever toward the arbor so that the knife portion thereof enters the groove 135' in the arbor and severs the tube forward of the groove from that rearwardly thereof and which is to constitute another length of tube as the arbor advances. When the carriage reaches the limit of its forward movmeent, air under pressure is admitted to cylinder 30 and at the same time to cylinder 180, swinging the lever 183 to the dotted line position (FIG. 8) so that the knife is maintained in the dotted line position until the carriage moves forward again on the next cycle of operation.

I claim:

1. Apparatus for converting the plurality of tapes into a tube of polygonal cross section comprising in combination a frame, a carriage mounted for longitudinal reciprocating movement on said frame, an arbor operatively connected to move with said carriage, reciprocable power means connected to said carriage for advancing and retracting said carriage, means rotating said arbor and for winding a plurality of tapes thereon to form a tube thereon, a shaft, a one-way clutch disposed on the shaft, a gear member fixed to said shaft, means for rotating said gear member, a gear member carried by a part of said clutch and a member connected to said carriage and including a gear rack operatively engaged with the gear carried by said clutch part, whereby said carriage and arbor are advanced at a controlled rate of speed through said clutch on one stroke of said reciprocable power means and uncontrolled by said clutch on the opposite stroke of said reciprocable power means.

2. The combination set forth in claim 1 in which the reciprocable power means comprises an air cylinder, piston, and piston rod, the piston rod being operatively connected to the carriage, and means for supplying air under pressure to opposite sides of the piston to effect reciprocation of the piston.

3. Apparatus for intermittently converting tape into a tube of polygonal cross section, comprising: an elongated frame, an elongated arbor of polygonal cross section mounted on said frame for rotation about the axis thereof and for axial movement in a direction longitudinally of the frame, means coupled to said arbor adjacent one end thereof for forwardly advancing said arbor during rotation thereof and for retracting said arbor when the same is not rotating, primary gripping means fixed against movement longitudinally of said frame and adjacent said one arbor end for winding tape helically around the advancing rotating arbor to form a tube of polygonal cross section around the arbor, first gripping means fixed on said frame against movement longitudinally of said frame immediately adjacent the forward side of said primary gripping means for applying pressure to said tube primarily during arbor retraction, and second gripping means coupled to said advancing means and spaced forwardly of said first gripping means for applying pressure to said tube primarily during arbor advancement, each of said gripping means being mounted on said frame for rotation with said arbor, and means coupled to said primary gripping means for rotating said arbor.

4. The structure of claim 3 in which said primary gripping means includes a subframe carrying a plurality of cylindrical rollers, one for each side of the arbor, with said first gripping means rigidly coupled to said subframe.

5. The structure of claim 3 in which said arbor has an annular groove therein and said second gripping means includes a movable blade positioned exteriorly of a tube formed on said arbor, and means on said second gripping means for moving said blade into said groove.

6. The structure of claim 3 in which said second gripping means includes a subframe pivotably supporting a pair of members arranged to engage opposite sides of said tube, and means urging said members to pivot in an arc parallel to said arbor axis.

7. The structure of claim 3 in which said first gripping means includes a plurality of members for applying perimetric pressure in a generally planar zone to said tube.

8. Apparatus for intermittently converting tape into a tube of polygonal cross section, comprising: an elongated frame, an elongated arbor of polygonal cross section mounted on said frame for rotation about the axis thereof and for axial movement in a direction longitudinally of the frame, means for advancing and retracting said arbor, means for winding tape helically around the advancing rotating arbor to form a tube of polygonal cross section around the arbor, and gripping means, including a plurality of plates arranged in side-by-side relation longitudinally of said arbor, with adjacent plates providing tube-contacting edges defining angles corresponding to the angles of said polygonal cross section mounted for rotation with said arbor but fixed on said frame against movement lengthwise of said arbor for applying perimetric pressure in a generally planar zone to said tube whereby the tube cambered sides are converted to planar sides disposed in spaced concentric relation to said arbor.

*9. Apparatus for intermittently converting tape into a tube of polygonal cross section, comprising: an elongated frame, an elongated arbor of polygonal cross section mounted on said frame for rotation about the axis thereof and for axial movement in a direction longitudinally of the frame, means on said frame coupled to said arbor for rotating the same only during advancement thereof, means coupled to said arbor adjacent one end thereof for forwardly advancing said arbor during rotation thereof and for retracting said arbor when the same is not rotating, means fixed against movement longitudinally of said frame and adjacent said one arbor end for winding tape helically around the advancing rotating arbor to form a tube of polygonal cross section around the arbor, gripping means fixed on said frame against movement longitudinally of said frame immediately adjacent the forward side of said winding means for applying pressure to said tube primarily during arbor retraction, means on said frame spaced forwardly of said gripping means for severing said tube, said arbor being equipped with an annular groove in alignment with said severing means during tube severance, whereby said tube is supported on said arbor during tube severance, and means operably associated with said severing means and interposed between said gripping means and severing means for contacting a tube during severance thereof.*

*10. The structure of claim 9 in which said severing means is synchronized with said advancing and retracting means for severing said tube after arbor retraction.*

References Cited by the Examiner

The following references, cited by the Examiner, are of record in the patented file of this patent or the original patent.

UNITED STATES PATENTS

| | | | |
|---|---|---|---|
| 1,625,470 | 4/27 | Jauch | 93—80 |
| 1,625,471 | 4/27 | Jauch | 93—80 |
| 1,666,844 | 4/28 | Centeno | 269—272 |
| 1,872,152 | 8/32 | Maltby | 93—80 |
| 1,932,942 | 10/33 | Thordarson | 93—80 |
| 2,246,043 | 6/41 | Heinmets | 93—82 |
| 2,699,099 | 1/55 | Robinson | 93—80 |
| 2,709,400 | 5/55 | Bugg | 93—80 |
| 2,723,605 | 11/55 | Stahl | 93—80 |

GRANVILLE Y. CUSTER, JR., *Primary Examiner.*

BERNARD STICKNEY, FRANK E. BAILEY, *Examiners.*